United States Patent
Lee (10) Patent No.: US 11,951,808 B2
(45) Date of Patent: Apr. 9, 2024

(54) SLIM TYPE AIR VENT FOR VEHICLE AND METHOD OF OPERATING THE SAME

(71) Applicant: HYUNDAI MOBIS Co., Ltd., Seoul (KR)

(72) Inventor: Yoyng Pyo Lee, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 127 days.

(21) Appl. No.: 17/530,762

(22) Filed: Nov. 19, 2021

(65) Prior Publication Data
US 2022/0153093 A1    May 19, 2022

(30) Foreign Application Priority Data
Nov. 19, 2020   (KR) .................. 10-2020-0156078

(51) Int. Cl.
*B60H 1/34*   (2006.01)

(52) U.S. Cl.
CPC ... *B60H 1/3421* (2013.01); *B60H 2001/3464* (2013.01)

(58) Field of Classification Search
CPC .............................. B60H 1/3421; B60H 1/247
USPC .......................................................... 454/155
See application file for complete search history.

(56) References Cited

U.S. PATENT DOCUMENTS

| | | | | |
|---|---|---|---|---|
| 9,989,275 B2* | 6/2018 | Oe | ....................... | B60H 1/3421 |
| 10,668,787 B2* | 6/2020 | Lee | ..................... | B60H 1/3421 |
| 11,065,939 B2* | 7/2021 | Lee | ..................... | B60H 1/3421 |
| 11,554,643 B2* | 1/2023 | Kim | .................... | B60H 1/00671 |
| 2015/0065031 A1* | 3/2015 | Shibata | ............... | B60H 1/3421 454/322 |
| 2018/0022193 A1* | 1/2018 | Lin | ........................ | B23P 19/04 454/155 |
| 2018/0304726 A1* | 10/2018 | Araujo Nieto | ....... | B60H 1/3421 |
| 2018/0354346 A1 | 12/2018 | Demerath | | |
| 2019/0092138 A1* | 3/2019 | Lee | ........................ | B60H 1/247 |
| 2021/0260969 A1* | 8/2021 | Kim | .................... | B60H 1/3421 |

FOREIGN PATENT DOCUMENTS

DE     10 2019 100 892 A1    7/2020

\* cited by examiner

*Primary Examiner* — Avinash A Savani
*Assistant Examiner* — Dana K Tighe
(74) *Attorney, Agent, or Firm* — Morgan, Lewis & Bockius LLP (57) ABSTRACT

A slim type air vent for a vehicle includes a housing a discharge port, through which air is discharged in a direction toward a vehicle interior, an upper horizontal wing accommodated in a region of the discharge port and rotatably coupled to the housing, a lower horizontal wing which is disposed under the upper horizontal wing in the region of the discharge port and is rotatable according to a preset rotation direction of the upper horizontal wing, a spacer which is accommodated in the region of the discharge port and rotatably supports the upper horizontal wing and the lower horizontal wing, and a rotation link which connects the upper horizontal wing to the lower horizontal wing and controls the lower horizontal wing to rotate according to a rotation direction of the upper horizontal wing.

16 Claims, 7 Drawing Sheets

SLIM TYPE AIR VENT FOR VEHICLE AND METHOD OF OPERATING THE SAME

CROSS-REFERENCE TO RELATED APPLICATION

This application claims priority to and the benefit of Korean Patent Application No. 10-2020-0156078, filed on Nov. 19, 2020, the disclosure of which is incorporated herein by reference in its entirety.

TECHNICAL FIELD

The present disclosure relates to an air vent, and more specifically, to a slim type air vent for a vehicle which changes a flow of air introduced into a vehicle interior.

BACKGROUND

Generally, an air vent, through which air is discharged according to operation of an air conditioner and a heater, includes a center air vent installed in a center fascia panel between driver and passenger seats and side air vents installed in crash pads at sides of the driver and passenger seats.

The air vent is manufactured in a structure in which the number of each of horizontal wings and vertical wings is at least six so that a vertical width is large.

Accordingly, due to the large size of the air vent, there are many disadvantages such as a problem of packaging with surrounding components and design constraints.

In addition, since the conventional air vent described above has the structure in which a plurality of horizontal and vertical wings should be externally exposed, the conventional air vent occupies a wide installation space in the center fascia panel or crash pad, and thus this becomes a cause of lowering a degree of design freedom for a cluster and an audio/video/navigation (AVN) device disposed around the air vent.

Accordingly, since the cluster and AVN device installed in the vehicle interior become larger, an installation position of the air vent tends to be changed to a lower region of the center fascia, and particularly, an exterior of the air vent tends to be designed as a slim type.

Therefore, in order to improve a degree of design freedom for the cluster and AVN device, a slim type air vent in which only one horizontal wing is externally exposed has been applied.

Meanwhile, since the slim type air vent including one horizontal wing has difficulty in precisely controlling a wind direction using one horizontal wing, a Coanda effect or an additional hidden wing which is not exposed to the outside of an inner side of a housing is required.

However, in order to apply the Coanda effect to the air vent, an inner side surface of the housing constituting the air vent should be formed in an inwardly bent shape.

Accordingly, in the housing for applying the Coanda effect, since the inner side surface becomes greater than a discharge port, there is a problem of an increase in total volume of the air vent.

In addition, in a case in which the hidden wing is applied, a space in which the hidden wing should be disposed is inevitably required in the housing.

Accordingly, in the case in which the hidden wing is applied, there is a problem of an increase in total volume of the air vent.

Particularly, in the case in which the hidden wing is applied, when the air vent is assembled, since the hidden wing should be assembled first, there is a problem in that an assembly process of the air vent is cumbersome.

SUMMARY

The present disclosure is directed to providing a slim type air vent for a vehicle in which a volume of the air vent is reduced.

The above-described objective, other objectives, advantages, features of the present disclosure, and methods of achieving the same will be clearly understood with reference to the embodiments described below and the accompanying drawings.

According to one aspect of the present disclosure, a slim type air vent for a vehicle includes a housing having a discharge port, through which air is discharged in a direction toward a vehicle interior, an upper horizontal wing accommodated in a region of the discharge port and rotatably coupled to the housing, a lower horizontal wing which is disposed under the upper horizontal wing in the region of the discharge port and is rotatable according to a preset rotation direction of the upper horizontal wing, a spacer which is accommodated in the region of the discharge port and rotatably supports the upper horizontal wing and the lower horizontal wing, and a rotation link which connects the upper horizontal wing to the lower horizontal wing and controls the lower horizontal wing to rotate according to a rotation direction of the upper horizontal wing.

The upper horizontal wing may include an adjustment knob which adjusts a direction of the air discharged from the discharge port, a first body part which is exposed to an outside of the discharge port, is coupled to the adjustment knob, and rotates according to adjustment of the adjustment knob, a first rotation shaft protrusion disposed on an end portion, which is disposed in the direction toward the vehicle interior, of the first body part and rotatably coupled to the spacer, and a rotation guide protrusion disposed at a position, which is spaced apart from the first rotation shaft in a direction opposite to the direction toward the vehicle interior, in the first body part and slidably coupled to the rotation link.

The lower horizontal wing may include an auxiliary wing of which an end portion disposed in the direction toward the vehicle interior is rotatably coupled to the spacer, a guide wing having a first end rotatably coupled to the auxiliary wing and a second end slidably coupled to the spacer, and a self-hinge which is rotatably inserted into an end portion of the auxiliary wing and an end portion of the guide wing to couple the auxiliary wing and the guide wing to each other.

The auxiliary wing may include a second body part rotatably coupled to the spacer in the direction toward the vehicle interior, a second rotation shaft protrusion disposed on an end portion, which is disposed in the direction toward the vehicle interior, of the second body part and rotatably coupled to the spacer, and a first link part disposed on another end portion, which is disposed in a direction in which the guide wing is disposed, of the second body part and rotatably coupled to the guide wing.

A length of the self-hinge may be greater than a width of the lower horizontal wing, and both ends of the self-hinge may protrude from both side surfaces of the lower horizontal wing and may be coupled to the rotation link.

The guide wing may include a third body part rotatably coupled to the auxiliary wing, a second link part disposed on the third body part in a direction in which the auxiliary wing is disposed and rotatably coupled to the auxiliary wing, and a horizontal guide protrusion disposed on an end portion, which is disposed in a direction opposite to a direction in which the second link part is disposed, of the third body part and slidably coupled to the spacer.

The self-hinge may pass through the first link part and the second link part so that the first link part and the second link part are rotatable.

The spacer may include a fourth body part having a plate shape, a first coupling groove to which the first rotation shaft protrusion is rotatably coupled, a second coupling groove which is defined at a position spaced downward from the first coupling groove and to which the second rotation shaft protrusion is rotatably coupled, and a horizontal guide groove to which the horizontal guide protrusion is slidably coupled.

The horizontal guide groove may include a first horizontal groove extending in the fourth body part in the direction toward the vehicle interior, a second horizontal groove extending in the fourth body part in the direction opposite to the direction toward the vehicle interior, and a first connection groove which connects the first horizontal groove and the second horizontal groove and in which the horizontal guide protrusion slides.

The rotation link may include a fifth body part constituting a body, a rotation guide groove to which the rotation guide protrusion is slidably coupled to guide a rotation trajectory of the upper horizontal wing, and a link fixing groove rotatably fixed to the self-hinge.

The rotation guide groove may include a first rotation groove defined in an upper portion of the fifth body part, a second rotation groove defined in the fifth body part at a position spaced downward from the first rotation groove, and a second connection groove which connects the first rotation groove and the second rotation groove and in which the rotation guide protrusion slides.

When the upper horizontal wing and the lower horizontal wing are parallel to each other, the rotation guide protrusion may be positioned in a direction toward the first rotation groove, and the horizontal guide protrusion may be positioned in a direction toward the second horizontal groove.

When the rotation guide protrusion rotates downward about the first rotation shaft protrusion, the rotation guide protrusion may be positioned in a direction toward the second rotation groove, and the horizontal guide protrusion may be positioned in a direction toward the second horizontal groove.

When the rotation guide protrusion rotates upward about the first rotation shaft protrusion, the rotation guide protrusion may be positioned in a direction toward the first rotation groove, and the horizontal guide protrusion may be positioned in a direction toward the first horizontal groove.

According to another aspect of the present disclosure, a slim type air vent for a vehicle includes a housing having a discharge port, through which air is discharged in a direction toward a vehicle interior, an upper horizontal wing accommodated in a region of the discharge port and rotatably coupled to the housing, and a lower horizontal wing which is disposed under the upper horizontal wing in the region of the discharge port and is rotatable according to a preset rotation direction of the upper horizontal wing, wherein the upper horizontal wing is provided as one upper horizontal wing.

The housing may include a duct which is fixed to the region of the discharge port and supports a spacer which is accommodated in the region of the discharge port and rotatably supports the upper horizontal wing and the lower horizontal wing.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Embodiments of the present disclosure are provided to more completely describe the present disclosure to those skilled in the art, the embodiments described below will be changed into various different forms, and the scope of the present disclosure is not limited to the following embodiments. Further, the embodiments are provided to make the present disclosure more complete and true and to convey the spirit of the present disclosure to those skilled in the art. In addition, in the following drawings, components are exaggerated for convenience and clarity of descriptions, and components that are the same are referred to by the same reference numerals. As used in the present specification, the term "and/or" includes any and all combinations of the associated listed items.

The terms used herein are used only to describe the specific embodiments and are not to limit the present disclosure.

Unless the context clearly indicates otherwise, the singular forms described in the specification include the plural forms. In addition, the terms "comprise" and "comprising," when used herein, specify some stated shapes, numbers, steps, operations, members, elements, and/or presence of groups thereof but do not preclude one or more other shapes, numbers, operations, members, elements, and/or presence or addition of groups thereof.

Hereinafter, an exemplary embodiment of the present disclosure will be described in detail with reference to the accompanying drawings.

Figure 1:
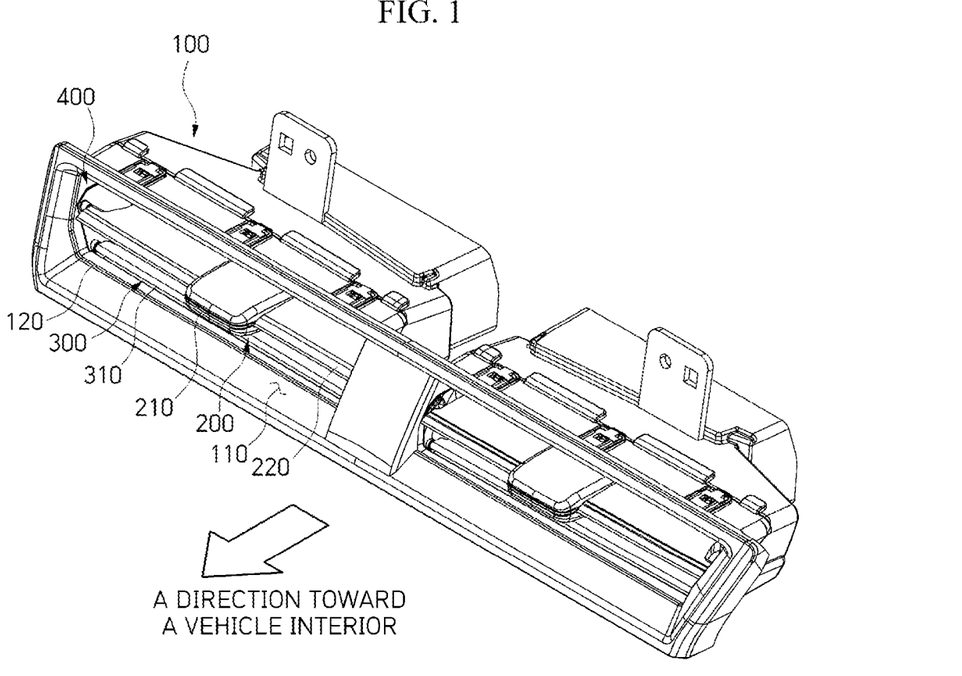
FIG. 1 is a perspective view illustrating a slim type air vent for a vehicle according to one embodiment of the present disclosure.
Figure 2:
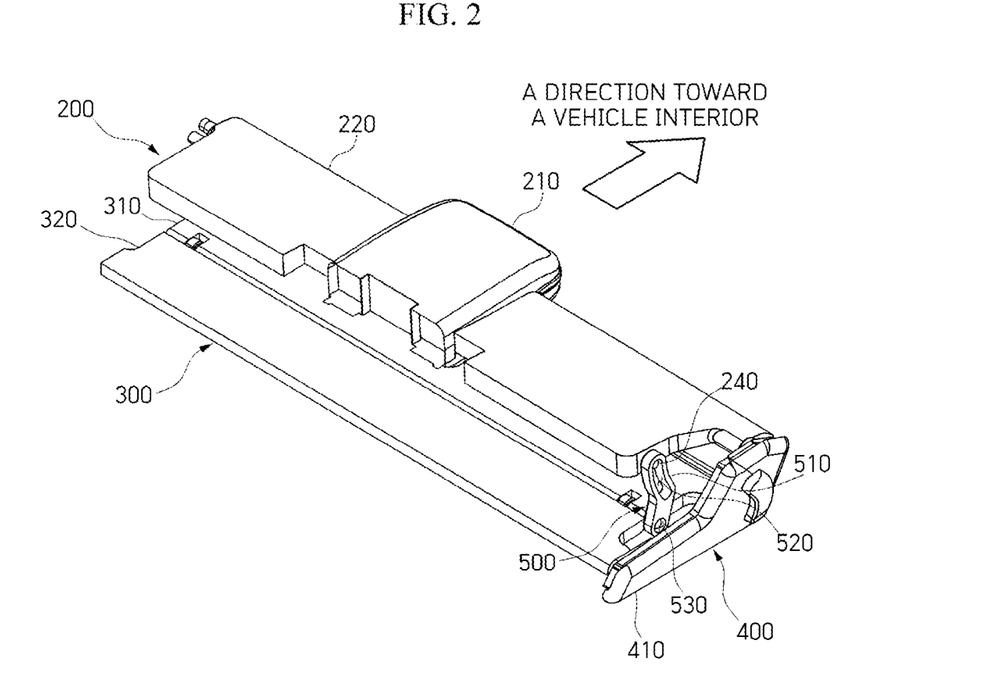
FIG. 2 is a perspective view illustrating a part of the slim type air vent for a vehicle according to one embodiment of the present disclosure.
Figure 3:
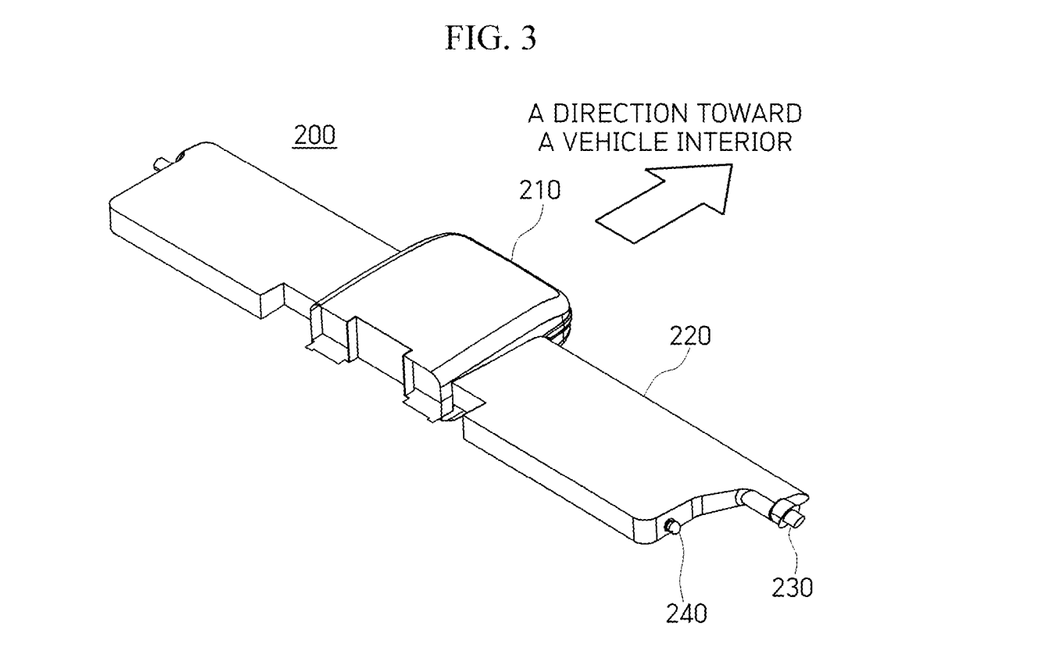
FIG. 3 is a perspective view illustrating an upper horizontal wing of the slim type air vent for a vehicle according to one embodiment of the present disclosure.
Figure 4:
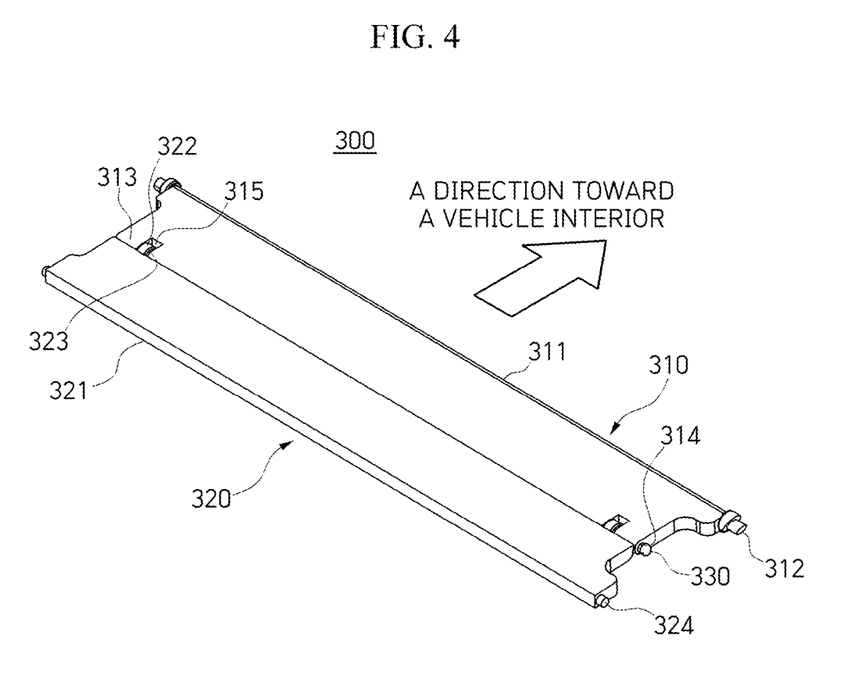
FIG. 4 is a perspective view illustrating a lower horizontal wing of the slim type air vent for a vehicle according to one embodiment of the present disclosure.
Figure 5:
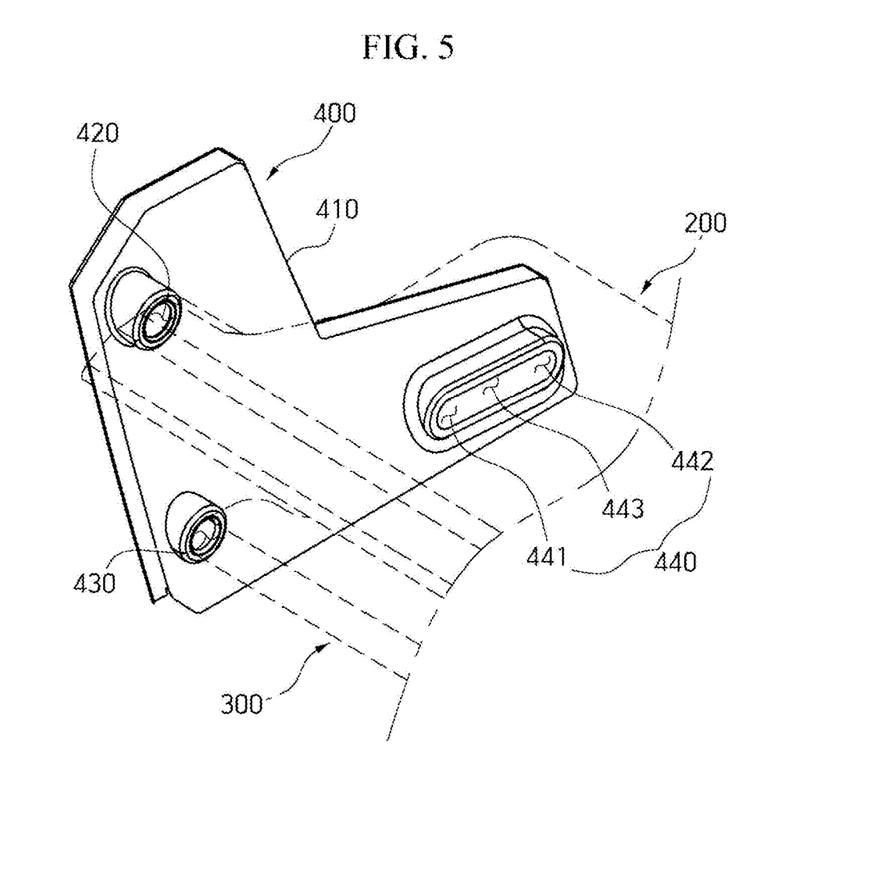
FIG. 5 is a perspective view illustrating a spacer of the slim type air vent for a vehicle according to one embodiment of the present disclosure.
Figure 6:
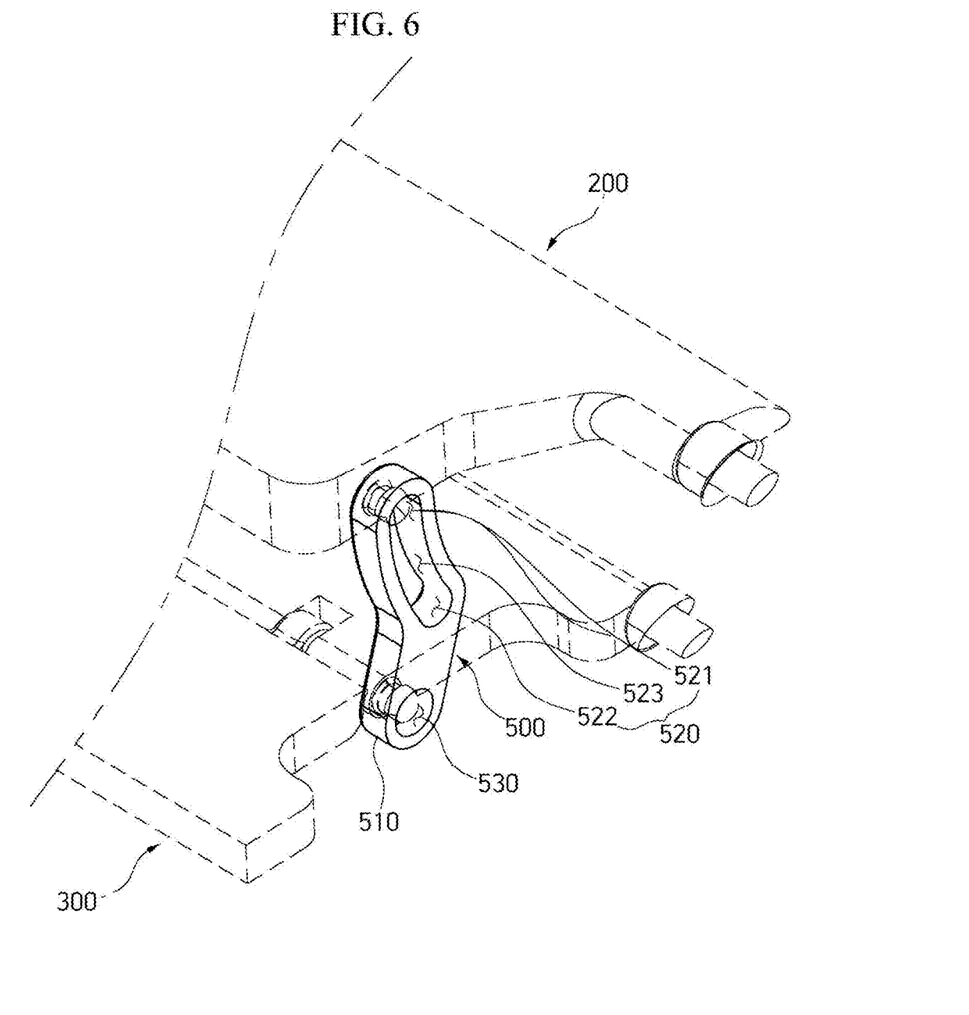
FIG. 6 is a perspective view illustrating a rotation link of the slim type air vent for a vehicle according to one embodiment of the present disclosure.

FIG. 1 is a perspective view illustrating a slim type air vent for a vehicle according to one embodiment of the present disclosure, FIG. 2 is a perspective view illustrating a part of the slim type air vent for a vehicle according to one embodiment of the present disclosure, FIG. 3 is a perspective view illustrating an upper horizontal wing of the slim type air vent for a vehicle according to one embodiment of the present disclosure, FIG. 4 is a perspective view illustrating a lower horizontal wing of the slim type air vent for a vehicle according to one embodiment of the present disclosure, FIG. 5 is a perspective view illustrating a spacer of the slim type air vent for a vehicle according to one embodiment of the present disclosure, and FIG. 6 is a perspective view illustrating a rotation link of the slim type air vent for a vehicle according to one embodiment of the present disclosure; and Referring to FIGS. 1 to 6, the slim type air vent for a vehicle according to one embodiment of the present disclosure includes a housing 100, an upper horizontal wing 200, a lower horizontal wing 300, spacers 400, and rotation links 500.

The housing 100 constitutes a body of the air vent, and a discharge port 110 through which air is discharged in a direction toward a vehicle interior is formed in the housing 100.

Air conditioning apparatuses are connected to a rear portion of the housing 100, and the air is discharged from the air conditioning apparatuses through the discharge port 110.

In the housing 100, a duct 120 may be formed in a region of the discharge port 110.

The duct 120 may be formed in a quadrangular frame shape and support the discharge port 110 of the housing 100.

Referring to FIGS. 1 to 3, the upper horizontal wing 200 is accommodated in the region of the discharge port 110 and rotatably coupled to the housing 100.

Meanwhile, only one upper horizontal wing 200, which relates to the slim type air vent of the present disclosure, is disposed in the housing 100.

Accordingly, the present disclosure may effectively secure a degree of design freedom for a cluster and an audio/video/navigation (AVN) device disposed around the air vent.

The upper horizontal wing 200 includes an adjustment knob 210, a first body part 220, first rotation shaft protrusions 230, and rotation guide protrusions 240.

The adjustment knob 210 adjusts a direction of air discharged from the discharge port 110.

A user may grasp and vertically move the adjustment knob 210 to adjust the direction of the air discharged from the discharge port 110 of the housing 100.

The first body part 220 constitutes a body of the upper horizontal wing 200 and is exposed to the outside of the discharge port 110.

In addition, the adjustment knob 210 is coupled to a central portion of the first body part 220, and the first body part 220 is rotated according to adjustment of the adjustment knob 210.

That is, when the user grasps and vertically moves the adjustment knob 210, a first body rotates with respect to a discharge part.

The first rotation shaft protrusion 230 is formed on an end portion, which is disposed in the direction toward the vehicle interior, of the first body part 220.

In addition, the first rotation shaft protrusion 230 is rotatably coupled to the spacers 400.

The rotation guide protrusion 240 is formed on the first body part 220 at a position which is spaced apart from the first rotation shaft in a direction opposite to the direction toward the vehicle interior.

In addition, the rotation guide protrusion 240 is slidably coupled to the rotation link 500.

Referring to FIGS. 1, 2, and 4, the lower horizontal wing 300 is disposed under the upper horizontal wing 200 in the region of the discharge port 110.

In addition, the lower horizontal wing 300 rotates in a preset rotation direction of the upper horizontal wing 200.

Particularly, a lower surface of the lower horizontal wing 300 is in contact with an upper surface of the duct 120 or is spaced apart from the upper surface by a very close distance.

Accordingly, a thickness of the housing 100 may be decreased by reducing a region in which the lower horizontal wing 300 is disposed in the housing 100.

Accordingly, the present disclosure can effectively secure the degree of design freedom of the cluster and the AVN device disposed around the air vent.

The lower horizontal wing 300 includes an auxiliary wing 310, a guide wing 320, and a self-hinge 330.

An end portion, which is disposed in the direction toward the vehicle interior, of the auxiliary wing 310 is rotatably coupled to the spacer 400.

The auxiliary wing 310 includes a second body part 311, second rotation shaft protrusions 312, and first link parts 313.

The second body part 311 constitutes a body of the auxiliary wing 310 and is formed in a rectangular plate shape having a long length in a lateral direction when viewed from above.

In addition, the second body part 311 is rotatably coupled to the spacer 400 in the direction toward the vehicle interior.

The second body part 311 operates in the preset rotation direction of the upper horizontal wing 200.

The second rotation shaft protrusions 312 extend outward from both side surfaces of end portions, which are disposed in the direction toward the vehicle interior, of the second body part 311.

In addition, the second rotation shaft protrusions 312 are rotatably coupled to the spacers 400.

The first link parts 313 are formed on end portions, which are disposed in a direction in which the guide wing 320 is disposed, that is, the direction opposite to the direction toward the vehicle interior, of the second body part 311.

In addition, the guide wing 320 is rotatably coupled to the first link parts 313 by the self-hinge 330.

The guide wing 320 is disposed in the direction opposite to the direction toward the vehicle interior with respect to the auxiliary wing 310.

One end of the guide wing 320 is rotatably coupled to the auxiliary wing 310, and the other end thereof is slidably coupled to the spacer 400.

The guide wing 320 includes a third body part 321, second link parts 322, and horizontal guide protrusions 324.

The third body part 321 constitutes a body of the guide wing 320 and is formed in a rectangular plate shape having a long length in a lateral direction when viewed from above to correspond to a width of the second body part 311.

In addition, the third body part 321 is rotatably coupled to the auxiliary wing 310.

The third body part 321 operates in the preset rotation direction of the upper horizontal wing 200.

The second link part 322 is formed on the third body part 321 in a direction in which the auxiliary wing 310 is disposed and rotatably coupled to the auxiliary wing 310.

In addition, the second link part 322 is rotatably coupled to the first link part 313 of the auxiliary wing 310 by the self-hinge 330.

The horizontal guide protrusions 324 extend outward from both side surfaces of end portions, which are disposed in a direction opposite to a direction in which the second link parts 322 are formed, of the third body part 321.

In addition, the horizontal guide protrusions 324 are slidably coupled to the spacers 400.

Meanwhile, insertion grooves 315 are formed in the first link parts 313, and the second link parts 322 may be formed in a protrusion shape.

In addition, through holes 314 and 323 are formed in the first link parts 313 and the second link parts 322, respectively.

A pair of insertion grooves 315 are formed at positions spaced a predetermined distance inward from both end portions of the first link part 313.

In addition, the second link part 322 formed in the protrusion shape protrudes from the third body part 321 at a position corresponding to the insertion groove 315.

That is, the second link part 322 is inserted into the insertion groove 315.

Accordingly, the through holes 314 and 323 that are formed in the first link part 313 and the second link part 322 communicate with each other.

The self-hinge 330 is rotatably inserted into an end portion of the auxiliary wing 310 and an end portion of the guide wing 320 to couple the auxiliary wing 310 and the guide wing 320.

Specifically, the self-hinge 330 is formed in a cylindrical rod shape and passes through the through hole 314 of the first link part 313 and the through hole 323 of the second link part 322 so that the second body part 311 and the first body part 220 are rotatably coupled.

In addition, a length of the self-hinge 330 may be formed to be greater than a width of the second body part 311 and a width of the third body part 321.

That is, both ends of the self-hinge 330 protrude from the first link part 313 and the second link part 322.

The rotation links 500 are coupled to the both ends of the self-hinge 330 protruding from the first link part 313 and the second link part 322.

Referring to FIGS. 1, 2, and 5, a pair of spacers 400 are formed, are accommodated in the region of the discharge port 110, are disposed at both sides of the upper horizontal wing 200 and the auxiliary wing, and rotatably support the upper horizontal wing 200 and the lower horizontal wing 300.

The spacer 400 includes a fourth body part 410, a first coupling groove 420, a second coupling groove 430, and a horizontal guide groove 440.

The fourth body part 410 constitutes a body of the spacer 400 and is formed in a plate shape.

The first rotation shaft protrusion 230 is rotatably coupled to the first coupling groove 420.

In addition, the second coupling groove 430 is formed at a position spaced downward from the first coupling groove 420, and the second rotation shaft protrusion 312 is rotatably coupled to the second coupling groove 430.

That is, the upper horizontal wing 200 and the lower horizontal wing 300 may be firmly supported by the housing 100 through the spacers 400.

The horizontal guide protrusion 324 formed on the guide wing 320 of the lower horizontal wing 300 is slidably coupled to the horizontal guide groove 440.

That is, the horizontal guide groove 440 is formed in a fourth body part 410 as a horizontally long hollow shape to allow the horizontal guide protrusion 324 to be slidably coupled thereto.

Specifically, the horizontal guide groove 440 includes a first horizontal groove 441, a second horizontal groove 442, and a first connection groove 443.

The first horizontal groove 441 is formed in the direction toward the vehicle interior in the fourth body part 410, and the second horizontal groove 442 is formed in the direction opposite to the direction toward the vehicle interior in the fourth body part 410.

In addition, the first connection groove 443 connects the first horizontal groove 441 and the second horizontal groove 442, and the horizontal guide protrusion 324 slides in the first connection groove 443.

Accordingly, the horizontal guide protrusion 324 may selectively and easily slide into the horizontal guide groove 440.

Referring to FIGS. 1, 2, and 6, the rotation links 500 are disposed at both sides of the upper horizontal wing 200 and the lower horizontal wing 300 and connect the upper horizontal wing 200 and the lower horizontal wing 300.

That is, due to the rotation links 500, the upper horizontal wing 200 and the lower horizontal wing 300 are operated in conjunction with each other so that the rotation links 500 control the lower horizontal wing 300 to rotate according to a rotation direction of the upper horizontal wing 200.

The rotation link 500 includes a fifth body part 510, a rotation guide groove 520, and a link fixing groove 530.

The fifth body part 510 constitutes a body of the rotation link 500.

The rotation guide groove 520 is disposed in a direction in which the upper horizontal wing 200 is disposed in the fifth body part 510.

In addition, the rotation guide protrusion 240 is slidably coupled to the rotation guide groove 520 to guide a rotation trajectory of the upper horizontal wing 200.

That is, the rotation guide groove 520 is formed in a vertically long hollow shape in the fifth body part 510 to allow the rotation guide protrusion 240 to be slidably coupled thereto.

Specifically, the rotation guide groove 520 includes a first rotation groove 521, a second rotation groove 522, and a second connection groove 523, The first rotation groove 521 is formed in an upper portion, that is, in the direction in which the upper horizontal wing 200 is disposed, of the fifth body part 510, and the second rotation groove 522 is formed in a lower portion, that is, in a direction in which the lower horizontal wing 300 is disposed, of the fifth body part 510.

In addition, the second connection groove 523 connects the first rotation groove 521 and the second rotation groove 522, and the rotation guide protrusion 240 slides in the second connection groove 52.

To this end, the second connection groove 523 is concentric with the first rotation shaft protrusion 230.

Accordingly, the rotation guide protrusion 240 may selectively and easily slide in the rotation guide groove 520.

The link fixing groove 530 is rotatably fixed to each of the both ends of the self-hinge 330 protruding from the first link parts 313 and the second link parts 322.

Accordingly, in the rotation link 500, as the rotation guide protrusion 240 of the upper horizontal wing 200 is slidably coupled to the rotation guide groove 520, and the self-hinge 330 passing through the lower horizontal wing 300 is fixed to the link fixing groove 530, the upper horizontal wing 200 and the lower horizontal wing 300 may be firmly operated in conjunction with each other.

Hereinafter, an operation of the slim type air vent for a vehicle according to one embodiment of the present disclosure will be described in detail.

Figure 7A:
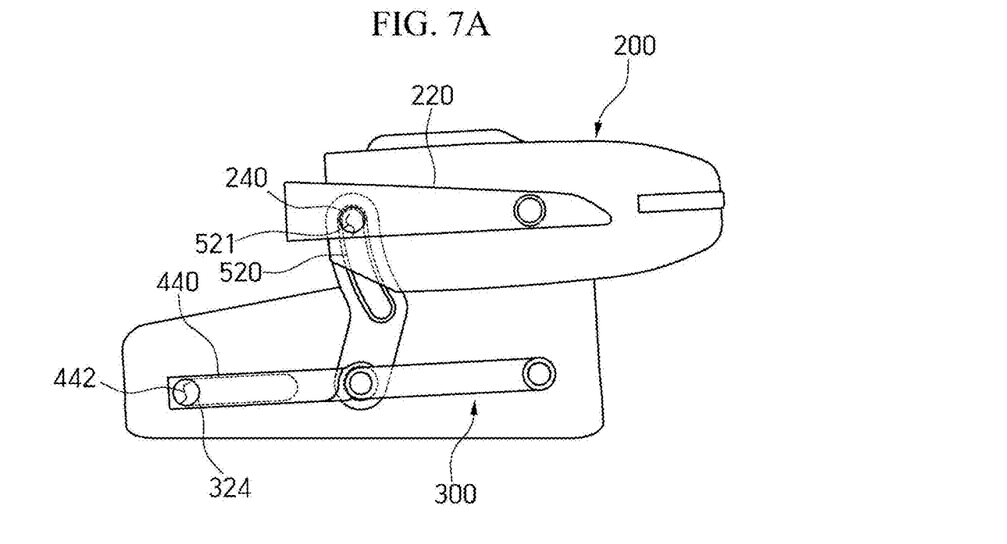
FIGS. 7A to 7C are operation views illustrating operation states of the slim type air vent for a vehicle according to one embodiment of the present disclosure.
Figure 7B:
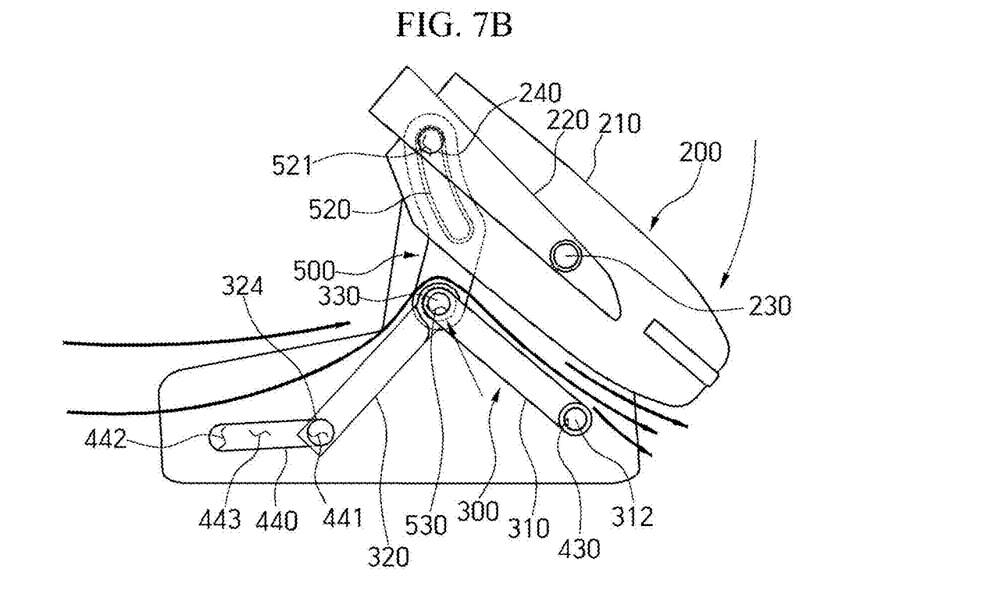
Figure 7C:
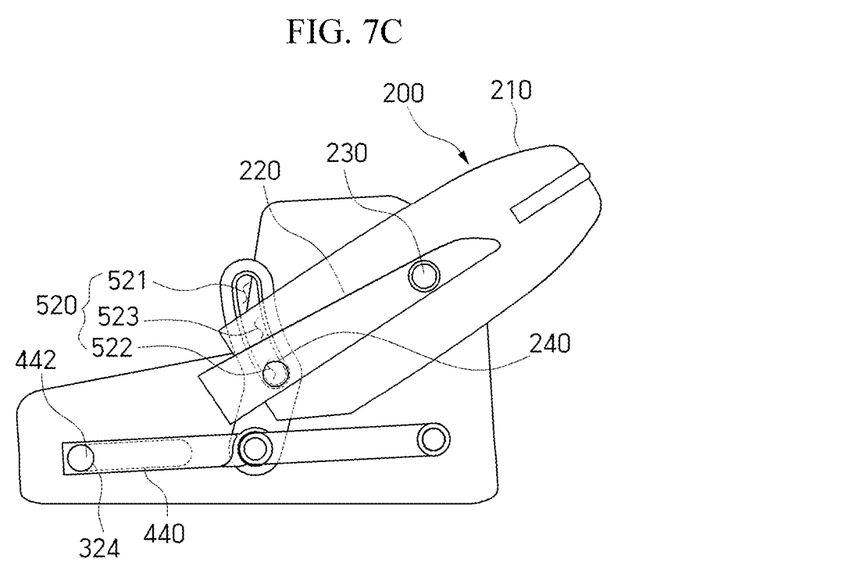

FIGS. 7A to 7C are operation views illustrating operation states of the slim type air vent for a vehicle according to one embodiment of the present disclosure.

First, as illustrated in FIG. 7A, in a case in which the upper horizontal wing 200 is parallel to the lower horizontal wing 300, the rotation guide protrusion 240 is positioned in a direction of the first rotation groove 521 of the rotation guide groove 520, and the horizontal guide protrusion 324 is positioned in a direction of the second horizontal groove 442 of the horizontal guide groove 440.

In addition, as illustrated in FIG. 7B, when the user manipulates the adjustment knob 210, which is coupled to the upper horizontal wing 200, downward, the rotation guide protrusion 240 rotates upward about the first rotation shaft protrusion 230 of the upper horizontal wing 200.

Accordingly, the rotation guide protrusion 240 of the upper horizontal wing 200 is positioned in the direction of the first rotation groove 521 of the rotation guide groove 520, and at the same time, the horizontal guide protrusion 324 is positioned in a direction of the first horizontal groove 441 from the second horizontal groove 442 along the first connection groove 443 of the horizontal guide groove 440.

In this case, the link fixing groove 530 of the rotation link 500 moves the self-hinge 330 fixed to the first link part 313 and the second link part 322 upward.

That is, since the second rotation shaft protrusion 312 of the auxiliary wing 310 is fixed to the second coupling groove 430 and the horizontal guide protrusion 324 of the guide wing 320 vertically moves along the horizontal guide groove 440, the auxiliary wing 310 and the guide wing 320 of the lower horizontal wing 300 are inclined in substantially a triangular shape with respect to each other.

Accordingly, air discharged from the discharge port 110 moves along an upper surface of the guide wing 320 of the lower horizontal wing 300 formed in the triangular shape, and the air passing along the guide wing 320 is discharged downward along an upper surface of the auxiliary wing 310.

In addition, as illustrated in FIG. 7C, when the user manipulates the adjustment knob 210, which is coupled to the upper horizontal wing 200, upward, the rotation guide protrusion 240 rotates downward about the first rotation shaft protrusion 230 of the upper horizontal wing 200.

Accordingly, the rotation guide protrusion 240 of the upper horizontal wing 200 is positioned in a direction of the second rotation groove 522 from the first rotation groove 521 along the second connection groove 523 of the rotation guide groove 520, and at the same time, the horizontal guide protrusion 324 is positioned in the direction of the second horizontal groove 442 of the horizontal guide groove 440.

As described above, in the slim type air vent for a vehicle of the present disclosure, when the user manipulates the adjustment knob 210 coupled to the upper horizontal wing 200, the upper horizontal wing 200 may operate in conjunction with the lower horizontal wing 300 to precisely control a direction of air.

Particularly, since the direction of the air can be efficiently adjusted using only the lower horizontal wing 300, a structure of the discharge port 110 can be simplified so that a degree of design freedom of a cluster, an AVN device, and the like disposed around the air vent can be secured.

According to the present disclosure, since a rotation link connects an upper horizontal wing and a lower horizontal wing, when a user manipulates an adjustment knob coupled to the upper horizontal wing, the upper horizontal wing rotates in conjunction with the lower horizontal wing so that there is an advantage of precisely adjusting a direction of air.

In addition, since the direction of the air can be efficiently adjusted using only the lower horizontal wing, a structure of a discharge port is simplified, and thus there is an effect of securing a degree of design freedom for a cluster and an AVN device disposed around the air vent.

As described above, the embodiment disclosed in the present specification should be considered in a descriptive sense only and not for purposes of limitation, the scope of the present disclosure is defined not by the above description but by the appended claims, and it should be interpreted that the scope of the present disclosure encompasses all differences falling within equivalents of the appended claims.

What is claimed is:

1. An air vent for a vehicle, comprising:
a housing having a discharge port, through which air is discharged in a direction toward a vehicle interior;
an upper horizontal wing accommodated in a region of the discharge port and rotatably coupled to the housing;
a lower horizontal wing which is disposed under the upper horizontal wing in the region of the discharge port and is rotatable according to a preset rotation direction of the upper horizontal wing;
a spacer which is accommodated in the region of the discharge port and rotatably supports the upper horizontal wing and the lower horizontal wing; and
a rotation link which connects the upper horizontal wing to the lower horizontal wing and controls the lower horizontal wing to rotate according to a rotation direction of the upper horizontal wing,
wherein the lower horizontal wing includes:
an auxiliary wing of which an end portion disposed in the direction toward the vehicle interior is rotatably coupled to the spacer;
a guide wing having a first end rotatably coupled to the auxiliary wing and a second end slidably coupled to the spacer; and
a self-hinge which is rotatably inserted into an end portion of the auxiliary wing and an end portion of the guide wing to couple the auxiliary wing and the guide wing to each other.

2. The air vent of claim 1, wherein the upper horizontal wing includes:
an adjustment knob which adjusts the direction of the air discharged from the discharge port;
a first body part which is exposed to an outside of the discharge port, is coupled to the adjustment knob, and rotates according to adjustment of the adjustment knob;
a first rotation shaft protrusion disposed on an end portion, of the first body part and rotatably coupled to the spacer; and
a rotation guide protrusion disposed at a position, which is spaced apart from the first rotation shaft in a direction opposite to the direction toward the vehicle interior, in the first body part and slidably coupled to the rotation link.

3. The air vent of claim 2, wherein the auxiliary wing includes:
a second body part rotatably coupled to the spacer in the direction toward the vehicle interior;
a second rotation shaft protrusion disposed on an end portion, which is disposed in the direction toward the vehicle interior, of the second body part and rotatably coupled to the spacer; and a first link part disposed on another end portion, which is disposed in a direction in which the guide wing is disposed, of the second body part and rotatably coupled to the guide wing.

4. The air vent of claim 3, wherein:
a length of the self-hinge is less than a width of the lower horizontal wing; and
both ends of the self-hinge protrude from both side surfaces of the lower horizontal wing and are coupled to the rotation link.

5. The air vent of claim 3, wherein the guide wing includes:
a third body part rotatably coupled to the auxiliary wing;
a second link part disposed on the third body part in a direction in which the auxiliary wing is disposed and rotatably coupled to the auxiliary wing; and
a horizontal guide protrusion disposed on an end portion, which is disposed in of the third body part and rotatably coupled to the spacer.

6. The air vent of claim 5, wherein the self-hinge passes through the first link part and the second link part so that the first link part and the second link part are rotatable.

7. The air vent of claim 5, wherein the spacer includes:
a fourth body part having a plate shape;
a first coupling groove to which the first rotation shaft protrusion is rotatably coupled;
a second coupling groove which is defined at a position spaced downward from the first coupling groove and to which the second rotation shaft protrusion is rotatably coupled; and
a horizontal guide groove to which the horizontal guide protrusion is slidably coupled.

8. The air vent of claim 7, wherein the horizontal guide groove includes:
a first horizontal groove extending in the fourth body part in the direction toward the vehicle interior;
a second horizontal groove extending in the fourth body part in the direction opposite to the direction toward the vehicle interior; and
a first connection groove which connects the first horizontal groove and the second horizontal groove and in which the horizontal guide protrusion slides.

9. The air vent of claim 8, wherein the rotation link includes:
a fifth body part constituting a body;
a rotation guide groove to which the rotation guide protrusion is slidably coupled to guide a rotation trajectory of the upper horizontal wing; and
a link fixing groove rotatably fixed to the self-hinge.

10. The air vent of claim 9, wherein the rotation guide groove includes:
a first rotation groove defined in an upper portion of the fifth body part;
a second rotation groove defined in the fifth body part at a position spaced downward from the first rotation groove; and
a second connection groove which connects the first rotation groove and the second rotation groove and in which the rotation guide protrusion slides.

11. The air vent of claim 10, wherein, when the upper horizontal wing and the lower horizontal wing are parallel to each other:
the rotation guide protrusion is positioned in a direction toward the first rotation groove; and
the horizontal guide protrusion is positioned in a direction toward the second horizontal groove.

12. The air vent of claim 10, wherein, when the rotation guide protrusion rotates downward about the first rotation shaft protrusion:
the rotation guide protrusion is positioned in a direction toward the second rotation groove; and
the horizontal guide protrusion is positioned in a direction toward the second horizontal groove.

13. The air vent of claim 10, wherein, when the rotation guide protrusion rotates upward about the first rotation shaft protrusion:
the rotation guide protrusion is positioned in a direction toward the first rotation groove; and
the horizontal guide protrusion is positioned in a direction toward the first horizontal groove.

14. An air vent for a vehicle, comprising:
a housing having a discharge port, through which air is discharged in a direction toward a vehicle interior;
an upper horizontal wing accommodated in a region of the discharge port and rotatably coupled to the housing;
a lower horizontal wing which is disposed under the upper horizontal wing in the region of the discharge port and is rotatable according to a preset rotation direction of the upper horizontal wing; and
a rotation link which connects the upper horizontal wing to the lower horizontal wing and controls the lower horizontal wing to rotate according to the preset rotation direction of the upper horizontal wing,
wherein no horizontal wing that is rotatable other than the upper and lower horizontal wings is disposed inside the housing, and
wherein the rotation link and a portion of the lower horizontal wing coupled thereto are movable together in an up and down direction so as to rotate the lower horizontal wing according to the preset rotation direction of the upper horizontal wing.

15. The air vent of claim 14, wherein the housing includes a duct which is fixed to the region of the discharge port and supports a spacer which is accommodated in the region of the discharge port and rotatably supports the upper horizontal wing and the lower horizontal wing.

16. An air vent for a vehicle, comprising:
a housing having a discharge port, through which air is discharged in a direction toward a vehicle interior;
an upper horizontal wing accommodated in a region of the discharge port and rotatably coupled to the housing;
a lower horizontal wing which is disposed under the upper horizontal wing in the region of the discharge port and is rotatable according to a preset rotation direction of the upper horizontal wing; and
a spacer which is accommodated in the region of the discharge port and rotatably supports the upper horizontal wing and the lower horizontal wing,
wherein the lower horizontal wing includes:
an auxiliary wing of which an end portion disposed in the direction toward the vehicle interior is rotatably coupled to the spacer;
a guide wing having a first end rotatably coupled to the auxiliary wing and a second end slidably coupled to the spacer; and
a self-hinge which is rotatably inserted into an end portion of the auxiliary wing and an end portion of the guide wing to couple the auxiliary wing and the guide wing to each other.

* * * * *